United States Patent
Singh et al.

(10) Patent No.: US 10,505,899 B1
(45) Date of Patent: Dec. 10, 2019

(54) APPARATUS, SYSTEM, AND METHOD FOR APPLYING FIREWALL RULES ON PACKETS IN KERNEL SPACE ON NETWORK DEVICES

(71) Applicant: Juniper Networks, Inc., Sunnyvale, CA (US)

(72) Inventors: Prashant Singh, Santa Clara, CA (US); Sreekanth Rupavatharam, Campbell, CA (US); Hariprasad Shanmugam, Kanata (CA); Erin MacNeil, Carp (CA)

(73) Assignee: Juniper Networks, Inc, Sunnyvale, CA (US)

( * ) Notice: Subject to any disclaimer, the term of this patent is extended or adjusted under 35 U.S.C. 154(b) by 214 days.

(21) Appl. No.: 15/675,949

(22) Filed: Aug. 14, 2017

(51) Int. Cl.
*H04L 29/06* (2006.01)

(52) U.S. Cl.
CPC ...... *H04L 63/0263* (2013.01); *H04L 63/0236* (2013.01); *H04L 63/029* (2013.01); *H04L 63/1441* (2013.01); *H04L 63/205* (2013.01)

(58) Field of Classification Search
CPC ............ H04L 63/0263; H04L 63/0236; H04L 63/1441; H04L 63/205
USPC .......................................................... 726/1
See application file for complete search history.

(56) References Cited

U.S. PATENT DOCUMENTS

| | | | | |
|---|---|---|---|---|
| 7,760,735 | B1* | 7/2010 | Chen | H04L 41/12 370/245 |
| 7,817,571 | B2* | 10/2010 | Claise | H04L 63/101 370/252 |
| 2005/0259646 | A1* | 11/2005 | Smith | H04L 12/66 370/389 |
| 2009/0092057 | A1* | 4/2009 | Doctor | G06F 21/56 370/252 |
| 2011/0149966 | A1* | 6/2011 | Pope | H04L 49/30 370/392 |
| 2013/0294250 | A1* | 11/2013 | Berelejis | H04L 47/193 370/236 |
| 2016/0112348 | A1* | 4/2016 | Meng | H04L 45/66 370/389 |
| 2016/0119374 | A1* | 4/2016 | Williams | H04L 63/1441 713/175 |
| 2016/0164835 | A1* | 6/2016 | Hoffmann | H04L 63/0272 726/1 |
| 2016/0191570 | A1* | 6/2016 | Bansal | H04L 63/0263 726/1 |

* cited by examiner

*Primary Examiner* — Dant B Shaifer Harriman
(74) *Attorney, Agent, or Firm* — FisherBroyles, LLP

(57) ABSTRACT

A disclosed method for applying firewall rules on packets in kernel space on network devices may include (1) intercepting, via a socket-intercept layer in kernel space on a routing engine of a network device, a packet that is destined for a remote device and then, in response to intercepting the packet in kernel space on the routing engine, (2) identifying an egress interface index that specifies an egress interface that (A) is external to kernel space and (B) is capable of forwarding the packet from the network device to the remote device and (3) applying, on the packet in kernel space, at least one firewall rule based at least in part on the egress interface index before the packet egresses from the routing engine. Various other apparatuses, systems, and methods are also disclosed.

16 Claims, 8 Drawing Sheets

APPARATUS, SYSTEM, AND METHOD FOR APPLYING FIREWALL RULES ON PACKETS IN KERNEL SPACE ON NETWORK DEVICES

BACKGROUND

Network devices often apply firewall filters and/or rules on incoming and/or outgoing traffic. In some examples, an administrator may want to have the network device apply certain firewall filters and/or rules on only select interfaces. In such examples, the network device may be programmed to enforce those firewall filters and/or rules on some interfaces but not others. Unfortunately, the enforcement of those firewall filters and/or rules on only select interfaces may present certain challenges and/or difficulties.

As an example, in some network devices (such as LINUX-based routers), the operating system kernels may be unable to access information that identifies the external interfaces on which packets ingress and/or egress. For example, a network device may include a routing engine that implements a LINUX kernel. In this example, the LINUX kernel may be unable to access information that identifies the interface corresponding to an incoming or outgoing packet. That interface information may be available only in user space, not kernel space. As a result, the LINUX kernel may be unable to apply relevant firewall filters and/or rules on that packet based on the corresponding interface.

In another example, a network device may be able to apply certain firewall filters and/or rules in user space, as opposed to kernel space. However, this scenario may enable unwanted incoming packets to actually reach user space even in the event that such firewall filters and/or rules are intended to prevent such packets from doing so.

In a further example, a network device may be able to apply certain firewall filters and/or rules at a packet forwarding engine rather than the routing engine. For example, a network device may include a routing engine and a packet forwarding engine that are communicatively connected to one another. In this example, the packet forwarding engine may include various interfaces that are external to the routing engine. The packet forwarding engine may be programmed to enforce certain firewall filters and/or rules. However, the packet forwarding engine may have difficulty applying certain firewall filters and/or rules on packets and/or packet fragments that require reassembly.

The instant disclosure, therefore, identifies and addresses a need for additional and improved apparatuses, systems, and methods for applying firewall rules on packets in kernel space on network devices.

SUMMARY

As will be described in greater detail below, the instant disclosure generally relates to apparatuses, systems, and methods for applying firewall rules on packets in kernel space on network devices. In one example, a method for accomplishing such a task may include (1) intercepting, via a socket-intercept layer in kernel space on a routing engine of a network device, a packet that is destined for a remote device and then, in response to intercepting the packet in kernel space on the routing engine, (2) identifying an egress interface index that specifies an egress interface that (A) is external to kernel space and (B) is capable of forwarding the packet from the network device to the remote device and (3) applying, on the packet in kernel space, at least one firewall rule based at least in part on the egress interface index before the packet egresses from the routing engine.

Similarly, a system that implements the above-described method may include (1) a socket-intercept layer, stored in kernel space on a physical routing engine of a network device, that (A) intercepts a packet that is destined for a remote device and (B) identifies, in response to intercepting the packet, an egress interface index that specifies an egress interface that (I) is external to kernel space and (II) is capable of forwarding the packet from the network device to the remote device and (2) a network-layer filter, stored in kernel space on the physical routing engine, that applies on the packet at least one firewall rule based at least in part on the egress interface index before the packet egresses from the routing engine.

In addition, a network device that implements the above-described method may include (1) a physical routing engine that comprises (A) a socket-intercept layer, stored in kernel space, that (I) intercepts a packet that is destined for a remote device and (II) identifies, in response to intercepting the packet, an egress interface index that specifies an egress interface that is external to kernel space and capable of forwarding the packet from the network device to the remote device and (B) a network-layer filter, stored in kernel space, that applies on the packet at least one firewall rule based at least in part on the egress interface index before the packet egresses from the routing engine and (2) a physical packet forwarding engine that forwards the packet to the remote device based at least in part on the egress interface index after the packet has egressed from the routing engine.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
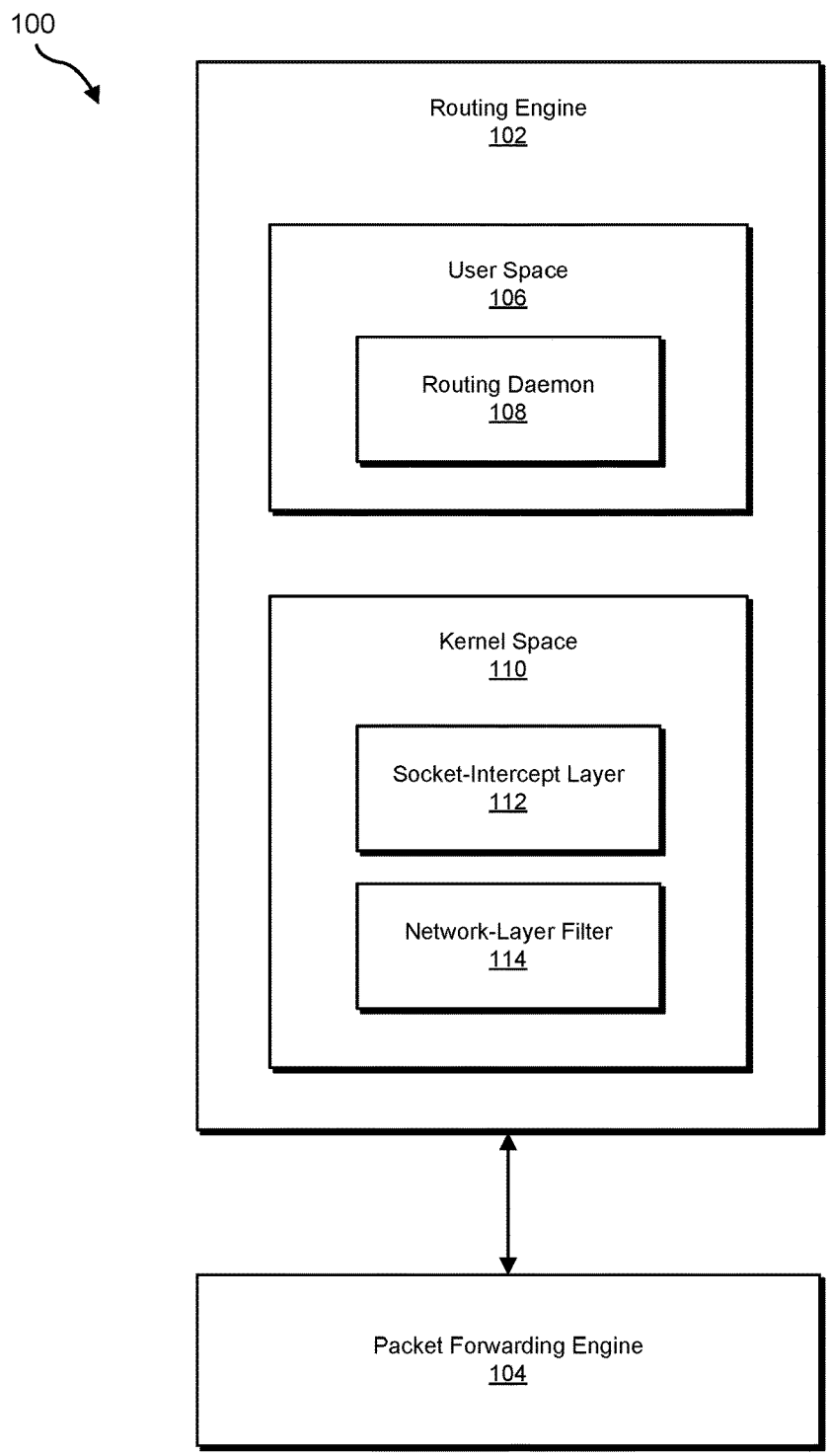
FIG. 1 is a block diagram of an exemplary apparatus for applying firewall rules on packets in kernel space on network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for applying firewall rules on packets in kernel space on network devices. As will be explained in greater detail below, embodiments of the instant disclosure may enable network devices to apply firewall rules in kernel space. For example, embodiments of the instant disclosure may include and/or involve a socket-intercept layer that intercepts a packet in kernel space on a routing engine of a network device. In this example, the packet may have originated from an application in user space on the routing engine and be destined for a remote device.

The socket-intercept layer may identify an egress interface index that specifies an egress interface. This egress interface may be (1) external to kernel space and (2) capable of forwarding the packet from the network device to the remote device. In one example, in the event that the application that initiated the packet is aware of the identity of the egress interface, the application may insert the egress interface index in the packet's metadata. Alternatively, in the event that the application that initiated the packet is unaware of the identity of the egress interface, the socket-intercept layer may query a routing daemon in user space on the routing engine for the egress interface index.

Embodiments of the instant disclosure may also include and/or involve a network-layer filter that applies and/or enforces firewall rules on packets. Continuing with the above example, after the egress interface index has been identified, the network-layer filter may apply and/or enforce at least one firewall rule on the packet based at least in part on the egress interface index. For example, the network-layer filter may cause the packet to egress out of a different interface than the one identified by the egress interface index due to the firewall rule. Alternatively, the network-layer filter may drop the packet in kernel space due to the firewall rule.

As another example, embodiments of the instant disclosure may involve and/or include a packet forwarding engine that receives, on a network device, an incoming packet from a remote device. In this example, the packet may be destined for an application that is running in user space on a routing engine of the network device. The packet forwarding engine may identify the ingress interface on which the packet arrived at the network device and then store an ingress interface index that specifies that ingress interface in the packet's metadata. The packet forwarding engine may then push the packet to the routing engine.

As the packet arrives at the routing engine, a network-layer filter may apply and/or enforce at least one firewall rule on the packet in kernel space. For example, the network-layer filter may drop the packet in kernel space and/or prevent the packet from reaching user space due to the firewall rule.

By applying firewall rules on packets in kernel space in this way, the various embodiments of the instant disclosure may be able to prevent unwanted and/or potentially malicious packets from exiting and/or continuing beyond kernel space. By preventing such packets from exiting and/or continuing beyond kernel space in this way, these embodiments may effectively reduce traffic and/or bottlenecking on the corresponding network device and/or bolster or improve the network device's security.

Moreover, by applying firewall rules on packets in kernel space in this way, the various embodiments of the instant disclosure may be able to enforce firewall filters and/or rules on packets or packet fragments that require reassembly. Furthermore, by applying firewall rules on packets in kernel space in this way, the various embodiments of the instant disclosure may be able to enforce firewall filters and/or rules in kernel space without tunneling the packets to another hop or external module, thereby avoiding the additional latency that comes with such tunneling.

The following will provide, with reference to FIG. 1, examples of apparatuses and corresponding components that facilitate applying firewall rules on packets in kernel space on network devices. The discussions corresponding to FIGS. 2 and 4 will describe exemplary implementations of apparatuses that facilitate applying firewall rules on packets in kernel space on network devices. The discussion corresponding to FIGS. 5 and 6 will describe exemplary journeys of an egressing packet and an ingressing packet, respectively. The discussion corresponding to FIG. 7 will describe an exemplary packet forwarding engine. Finally, the discussion corresponding to FIG. 8 will provide numerous examples of systems and/or devices that may incorporate the apparatus from FIG. 1.

FIG. 1 shows an exemplary apparatus 100 that facilitates applying firewall rules on packets in kernel space on network devices. As illustrated in FIG. 1, apparatus 100 may include and/or represent a routing engine 102 and a packet forwarding engine 104 in communication with one another. In this example, routing engine 102 may include a routing daemon 108 running in user space 106. Additionally or alternatively, routing engine 102 may include a socket-intercept layer 112 and a network-layer filter 114 that both run in kernel space 110.

Routing engine 102 generally represents and/or refers to a physical device and/or hardware that handles routing procedures, processes, and/or decisions. Routing engine 102 may include one or more Application-Specific Integrated Circuits (ASICs) and/or physical processors. Examples of such processors include, without limitation, microprocessors, microcontrollers, Central Processing Units (CPUs), Field-Programmable Gate Arrays (FPGAs) that implement softcore processors, portions of one or more of the same, variations or combinations of one or more of the same, and/or any other suitable physical processors.

In one example, routing engine 102 may control certain physical and/or virtual interfaces of a network device. In addition, routing engine 102 may include an operating system and/or certain applications that facilitate communication between the network device and other devices within a network.

Packet forwarding engine 104 generally represents and/or refers to a physical device and/or hardware that processes packets by forwarding the same between input and output interfaces. Packet forwarding engine 104 may include one or more ASICs and/or physical processors. Examples of such processors include, without limitation, microprocessors, microcontrollers, CPUs, FPGAs that implement softcore processors, portions of one or more of the same, variations or combinations of one or more of the same, and/or any other suitable physical processors.

In one example, packet forwarding engine 104 may include one or more egress interfaces (not explicitly illustrated in FIG. 1) out of which packets egress from the network device to the other devices within the network. Additionally or alternatively, packet forwarding engine 104 may include one or more ingress interfaces (not explicitly illustrated in FIG. 1) into which packets ingress to the network device from the other devices within the network.

In one example, routing engine 102 and packet forwarding engine 104 may be communicatively coupled and/or connected to one another via an interface that is internal to the network device. Accordingly, apparatus 100 may represent a portion of and/or be included in the network device. However, the network device may also include various other components in addition to and/or beyond those represented as and/or included in apparatus 100.

The term "user space," as used herein, generally refers to any type or form of memory and/or address space that has been designated for and/or allocated to application software and/or components. The term "kernel space," as used herein, generally refers to any type or form of memory and/or address space that has been designated for and/or allocated to an operating system kernel and/or operating system components. In one example, user space 106 and kernel space 110 may include and/or represent mutually exclusive virtual memory allocations and/or execution contexts that are separate and/or segregated from one another.

Routing daemon 108 generally represents and/or refers to a program, module, and/or component that manages and/or maintains certain state of a network device. In one example, routing daemon 108 may manage and/or maintain a routing table and/or routing information base for the network device. Additionally or alternatively, routing daemon 108 may manage and/or maintain information that identifies and/or specifies certain interfaces (such as egress and/or ingress interfaces) on packet forwarding engine 104. For example, routing daemon 108 may subscribe to information that identifies and/or specifies such interfaces from packet forwarding engine 104.

Socket-intercept layer 112 generally represents and/or refers to a program, module, component, and/or driver that receives, hijacks, and/or intercepts traffic. In one example, socket-intercept layer 112 may receive, intercept, and/or hijack traffic crossing from user space 106 into kernel space 110 on routing engine 102. Additionally or alternatively, socket-intercept layer 112 may receive, intercept, and/or hijack traffic passed from packet forwarding engine 104 to routing engine 102.

In addition, socket-intercept layer 112 may query routing daemon 108 in user space 106 for interface indexes that identify and/or specify the interfaces on which certain traffic has travelled and/or is to travel. This querying may take place and/or occur dynamically as packets are received and/or intercepted by socket-intercept layer 112.

Network-layer filter 114 generally represents and/or refers to a program, module, component, and/or driver that filters traffic based on firewall rules and/or applies firewall rules to traffic. In one example, network-layer filter 114 may apply and/or enforce firewall rules on incoming and outgoing packets. In this example, network-layer filter 114 may reside in and/or operate on the network layer and/or Layer 3 of the Open Systems Interconnection (OSI) model. Additionally or alternatively, network-layer filter 114 may reside in and/or operate on one or more Internet Protocol (IP) layers of the Transmission Control Protocol (TCIP)/IP Protocol Architecture.

Figure 2:
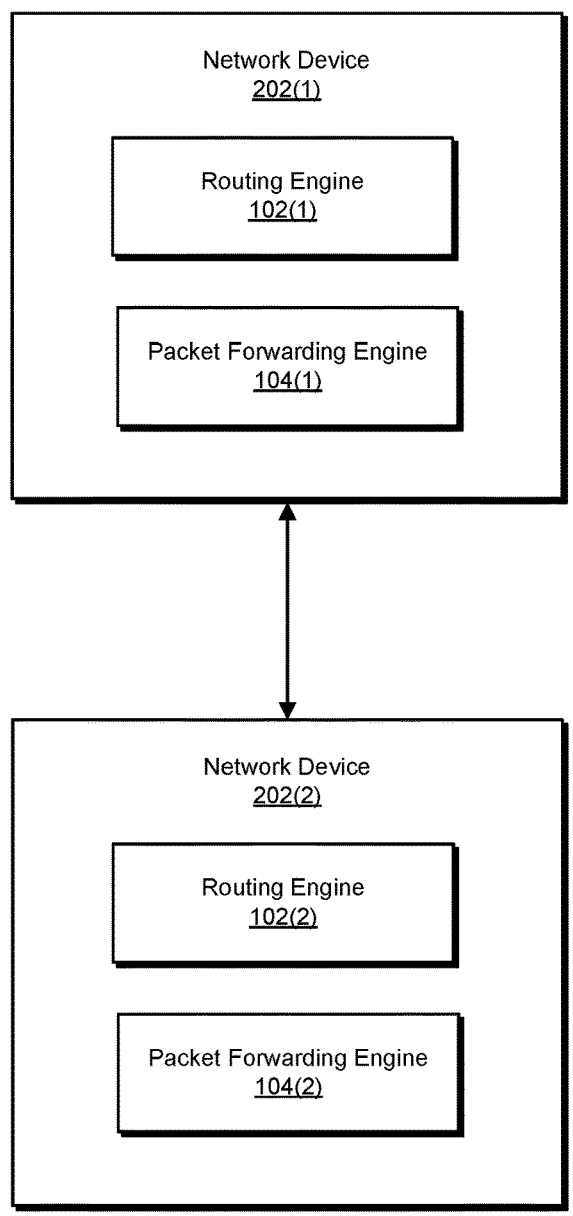
FIG. 2 is a block diagram of an exemplary implementation of an apparatus for applying firewall rules on packets in kernel space on network devices.

Apparatus 100 in FIG. 1 may be implemented in a variety of ways. For example, all or a portion of apparatus 100 may represent portions of exemplary implementation 200 in FIG. 2. As illustrated in FIG. 2, implementation 200 may include and/or represent network devices 202(1) and 202(2) in communication with one another. In this example, network device 202(1) may include routing engine 102(1) and packet forwarding engine 104(1) in communication with one another via an internal interface (not explicitly illustrated in FIG. 2). In addition, network device 202(2) may include routing engine 102(2) and packet forwarding engine 104(2) in communication with one another via an internal interface (not explicitly illustrated in FIG. 2).

Network devices 202(1) and 202(2) each generally represent a physical computing device that forwards traffic within a network and/or across networks. In one example, one or more of network devices 202(1) and 202(2) may include and/or represent a router, such as a Customer Edge (CE) router, a Provider Edge (PE) router, a hub router, a spoke router, an Autonomous System (AS) boundary router, and/or an area border router. Additional examples of network devices 202(1) and 202(2) include, without limitation, switches, hubs, modems, bridges, repeaters, gateways, portions of one or more of the same, combinations or variations of one or more of the same, and/or any other suitable network devices. Although FIG. 2 illustrates only two network devices, other embodiments may involve and/or incorporate various additional network devices.

In some examples, network devices 202(1) and 202(2) may be directly linked to one another such that they each represent the next hop of the other. In other examples, network devices 202(1) and 202(2) may be separated from one another by one or more intermediary devices (not illustrated in FIG. 2). In other words, intermediary devices may reside between network devices 202(1) and 202(2) and/or facilitate communication between network devices 202(1) and 202(2). Accordingly, implementation 200 may include additional network devices and/or components that are not necessarily illustrated in FIG. 2.

Figure 3:
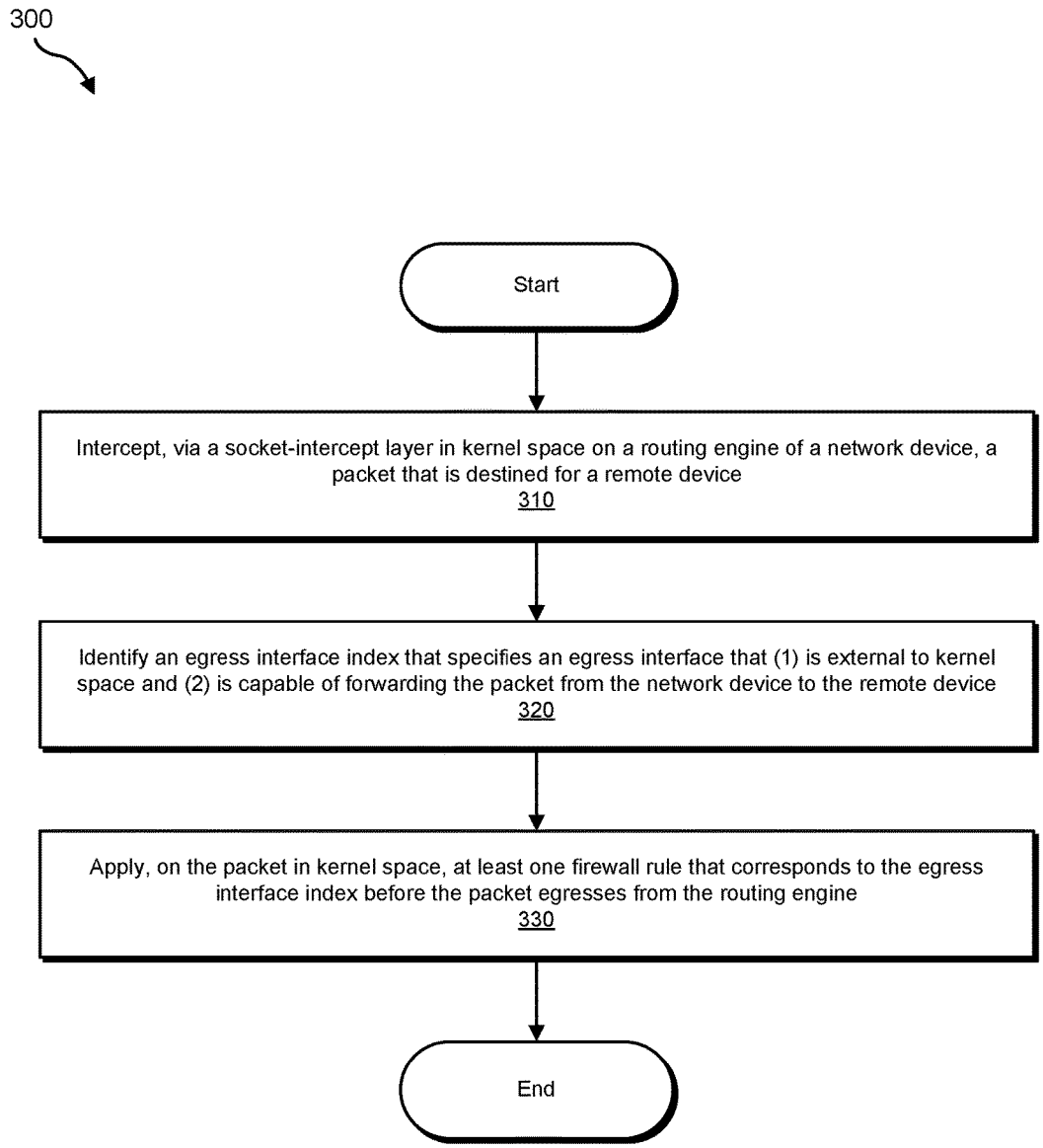
FIG. 3 is a flow diagram of an exemplary method for applying firewall rules on packets in kernel space on network devices.

FIG. 3 is a flow diagram of an exemplary computer-implemented method 300 for applying firewall rules on packets in kernel space on network devices. The steps shown in FIG. 3 may be performed by any suitable computer-executable code, computing system, and/or ASIC, including apparatus 100 in FIG. 1, implementation 200 in FIG. 2, exemplary implementation 400 in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may intercept, in kernel space on a routing engine of a network device, a packet that is destined for a remote device. For example, socket-intercept layer 112 may, as part of routing engine 102(1) on network device 202(1) in FIG. 2, intercept a packet that is destined for network device 202(2) in FIG. 2. In this example, socket-intercept layer 112 may reside, operate, and/or run in kernel space on network device 202(1).

The systems described herein may perform step 310 in a variety of different ways and/or contexts. In some examples, socket-intercept layer 112 may receive, hijack, and/or intercept a packet that originated from an application in user space (not illustrated in FIG. 2) on routing engine 102(1). For example, socket-intercept layer 112 may monitor traffic that passes and/or crosses from user space to kernel space on routing engine 102(1). In this example, an application in user space on network device 202(1) may bind to a tunnel driver in kernel space on network device 202(1). By binding to tunnel driver 114 in this way, the application may create a network socket that facilitates communication between the application and another application on network device 202(2). This network socket may include and/or represent one endpoint of a two-way communication link between applications running on different devices.

Upon creation of the network socket, the application in user space on network device 202(1) may generate a packet and then send the same from user space to kernel space. In other words, the application may push and/or pass the packet to the operating system kernel on routing engine 102(1) for transmission from network device 202(1) to network device 202(2). In this example, the packet may be destined for the other application on network device 202(2). As the packet enters kernel space, socket-intercept layer 112 may be monitoring traffic pushed and/or passed to the operating system kernel. Accordingly, while monitoring such traffic, socket-intercept layer 112 may receive, hijack, and/or intercept the packet.

Returning to FIG. 3, at step 320 one or more of the systems described herein may identify an egress interface index that specifies an egress interface. For example, socket-intercept layer 112 may, as part of routing engine 102(1) on network device 202(1) in FIG. 2, identify an egress interface index that specifies an egress interface corresponding to the packet. In this example, the egress interface specified by the egress interface index may be external to kernel space and/or the operating system kernel. In addition, this egress interface may be capable of forwarding the packet from network device 202(1) to a remote device, such as network device 202(2). This egress interface may also be the one to which packets originating from the application are bound. This egress interface may include and/or represent a physical component of packet forwarding engine 104(1).

The systems described herein may perform step 320 in a variety of different ways and/or contexts. In some examples, socket-intercept layer 112 may identify the egress interface corresponding to the packet based at least in part on the packet's metadata. For example, the application that initiated the packet in user space may be aware of the egress interface out of which the packet is to egress toward network device 202(2). In other words, the application may know which egress interface is to forward the packet toward network device 202(2). In this case, the application may insert the egress interface index that identifies and/or specifies the egress interface into a header (such as a control message or "CMSG" header) of the packet.

Continuing with this example, upon intercepting the packet, socket-intercept layer 112 may search the packet's header for the egress interface index. During this search, socket-intercept layer 112 may locate and/or identify the egress interface index. Socket-intercept layer 112 may then push, pass, and/or forward the packet down the network stack of communications protocols.

In another example, the application that initiated the packet in user space may be unaware of the egress interface out of which the packet is to egress toward network device 202(2). In other words, the application may not know which egress interface is to forward the packet toward network device 202(2). As a result, the application may be unable to insert the egress interface index into the packet's metadata.

In this example, upon intercepting the packet, socket-intercept layer 112 may query routing daemon 108 in user space on routing engine 102 for the egress interface index.

In this example, routing daemon 108 may have access to the identities of the egress interfaces by subscribing to the network interfaces on packet forwarding engine 104(1) and/or the corresponding interface information. In response to the query, routing daemon 108 may provide socket-intercept layer 112 with the egress interface index that specifies the egress interface out of which the packet is to egress from network device 202(1) to network device 202(2).

Upon receiving the egress interface index from routing daemon 108, socket-intercept layer 112 may record that egress interface index as metadata of the packet. For example, socket-intercept layer 112 may add the egress interface index to a header (such as a control message or "CMSG" header) of the packet. Socket-intercept layer 112 may then push, pass, and/or forward the packet down the network stack of communications protocols.

In one example, as the packet traverses the network stack, the packet may arrive at one or more transport-layer or Layer-4 (L4) hooks. In this example, the transport-layer or L4 hooks may intercept the packet and then copy the egress interface index from the control message header to a socket buffer (sometimes referred to as "skbuff") or mark field of the packet. Upon copying the egress interface index from the control message header to the socket buffer or mark field, the transport-layer or L4 hooks may pass the packet further down the network stack.

In one example, as the packet traverses further down the network stack, the packet may arrive at network-layer filter 114. In this example, network-layer filter 114 may include and/or represent an IP filter hook.

Returning to FIG. 3, at step 330 one or more of the systems described herein may apply at least one firewall rule on the packet based at least in part on the egress interface index before the packet egresses from the routing engine. For example, network-layer filter 114 may, as part of routing engine 102(1) on network device 202(1) in FIG. 2, apply at least one firewall rule based at least in part on the egress interface index. This firewall rule may be applied on the packet in kernel space before the packet egresses from routing engine 102(1). In this example, network-layer filter 114 may reside, operate, and/or run in kernel space on network device 202(1).

The systems described herein may perform step 330 in a variety of different ways and/or contexts. In one example, network-layer filter 114 may apply the firewall rule on the packet because the firewall rule has certain conditions that match corresponding attributes of the packet. For example, network-layer filter 114 may identify certain attributes of the packet, such as the source IP address, the destination IP address, the source port number, the destination port number, the packet's direction, and/or the egress interface. In this example, network-layer filter 114 may identify the egress interface specified by the egress interface index in the socket buffer of mark field of the packet.

Network-layer filter 114 may compare those attributes of the packet with certain match conditions of various firewall rules. During this comparison, network-layer filter 114 may identify a firewall rule whose conditions match those attributes of the packet. Network-layer filter 114 may then select that firewall rule for enforcement on the packet. In one example, the identified firewall rule may permit the packet to egress from network device 202(1) via the same egress interface specified by the egress interface index. In another example, the identified firewall rule may cause and/or direct network-layer filter 114 to drop the packet altogether.

In a further example, the identified firewall rule may cause and/or direct network-layer filter 114 to redirect the packet through a different egress interface. For example, the packet's socket buffer or mark field may identify the corresponding egress interface as "ge-0/0/0". In this example, the packet's header may also identify the source IP address as "1.1.1.0". Network-layer filter 114 may search for and identify a firewall rule whose match conditions correspond to those attributes of the packet. This firewall rule may cause and/or direct network-layer filter 114 to force the packet to egress out of another egress interface (e.g., "ge-0/0/1") on packet forwarding engine 104(1).

In one example, the firewall rule may cause the packet to egress out of a specific egress interface on packet forwarding engine 104(1). In another example, the firewall rule may cause the packet to egress out of any other interface besides the one specified by the egress interface index.

In some examples, upon applying and/or enforcing the firewall rule on the packet, network-layer filter 114 may push, pass, and/or forward the packet to packet forwarding engine 104(1). In turn, packet-forwarding engine 104(1) may forward the packet from network device 202(1) to remote device 202(2). In one example, packet-forwarding engine 104(1) may force the packet to egress out of the interface corresponding to the applied firewall rule. For example, in the event that the applied firewall rule forces the packet to egress out of a different interface than the one identified by the egress interface index, packet-forwarding engine 104(1) may ensure that the packet does not egress out of the egress interface identified by the egress interface index.

Figure 7:
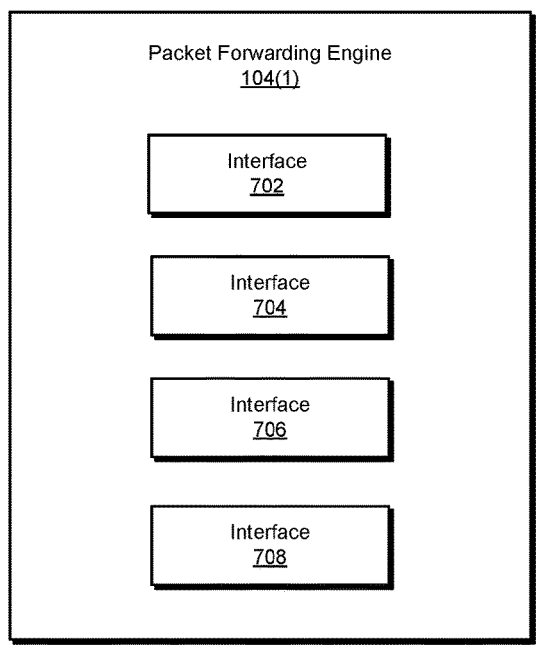
FIG. 7 is a block diagram of an exemplary packet forwarding engine.

As a specific example, packet forwarding engine 104(1) in FIG. 7 may include interfaces 702, 704, 706, and 708. In this example, interfaces 702, 704, 706, and 708 may represent and/or correspond to "ge-0/0/0", "ge-0/0/1", "ge-0/0/2", and "ge-0/0/3", respectively. In the event that the packet's header identifies the corresponding egress interface as "ge-0/0/0" but the matching firewall rule prevents the packet from egressing out of "ge-0/0/0", network-layer filter 114 may force the packet to egress out of one of interfaces 704, 706, and 708, as opposed to interface 702.

In addition to applying firewall rules to egressing packets, the embodiments of the instant disclosure may also involve applying firewall rules to ingressing packets. For example, packet forwarding engine 104(1) may receive a packet that is destined for an application running in user space on routing engine 102(1). In response to receiving this packet, packet forwarding engine 104(1) may identify the ingress interface through which the packet arrived. In this example, packet forwarding engine 104(1) may store an ingress interface index that specifies the ingress interface as metadata of the packet. Packet-forwarding engine 104(1) may then push, pass, and/or forward this packet to kernel space on routing engine 102(1).

As the packet arrives in kernel space on routing engine 102(1), network-layer filter 114 may apply a firewall rule based at least in part on the ingress interface index on the packet. For example, the packet's header may indicate that the packet arrived at packet forwarding engine 104(1) via ingress interface "ge-0/0/0". In this example, the packet's header may also identify the destination IP address as "1.1.1.1". Network-layer filter 114 may search for and identify a firewall rule whose match conditions correspond to those attributes of the packet. In one example, the matching firewall rule may cause and/or direct network-layer filter 114 to permit the packet to reach the destination application in user space on routing engine 102(1). In another example, the matching firewall rule may cause and/or direct network-layer filter 114 to drop the packet in kernel space, thereby preventing the packet from reaching the destination application in user space on routing engine 102(1).

Figure 4:
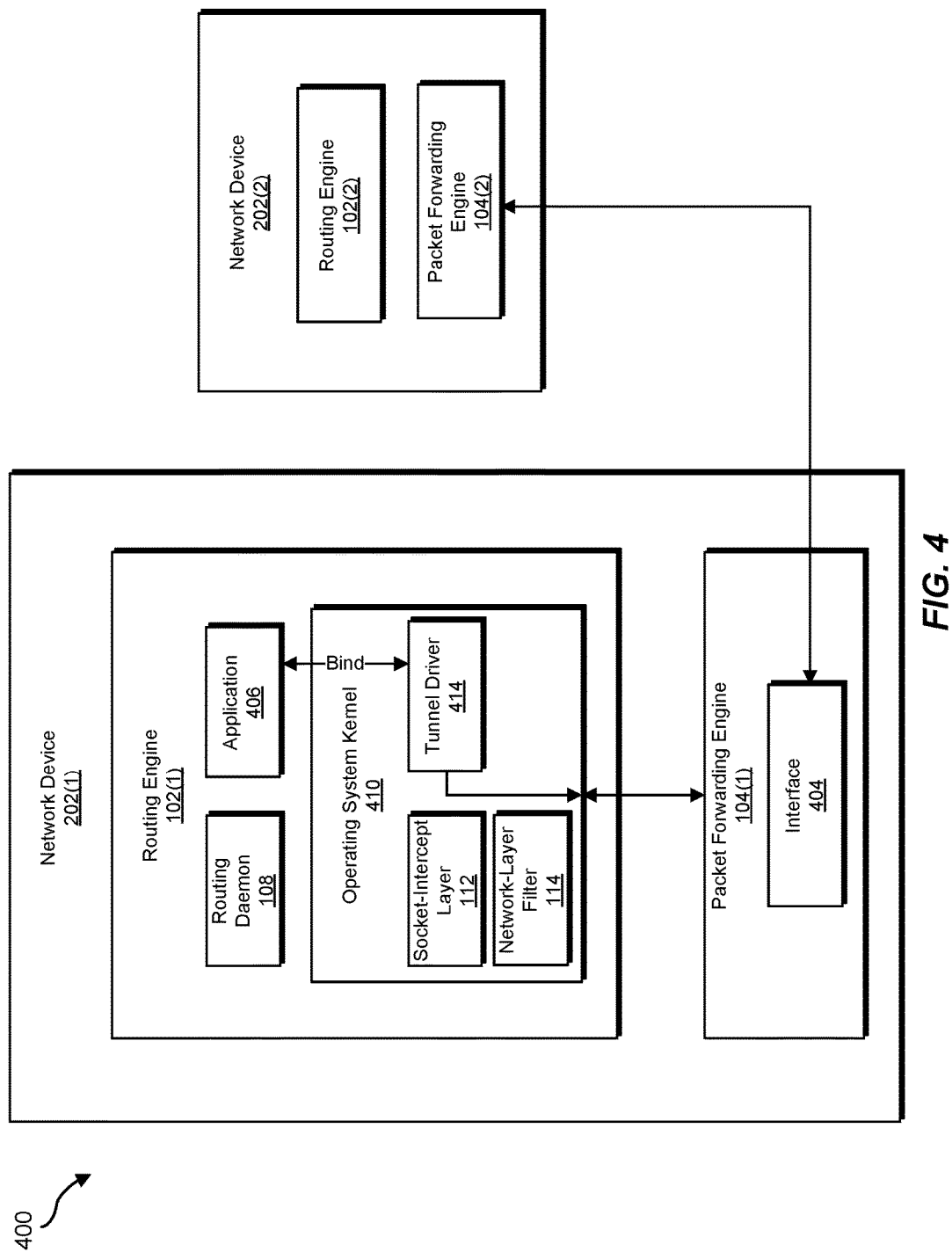
FIG. 4 is a block diagram of an exemplary implementation of an apparatus for applying firewall rules on packets in kernel space on network devices.

FIG. 4 illustrates an exemplary implementation 400 of an apparatus for applying firewall rules on packets in kernel space. As illustrated in FIG. 4, implementation 400 may include network devices 202(1) and 202(2), which are communicatively coupled to one another. In one example, network device 202(1) may include an application 406 running in user space on routing engine 102(1). As a specific example, application 406 may include and/or represent a Border Gateway Protocol (BGP) instance and/or process. In this example, application 406 in FIG. 4 may bind to a tunnel driver 414 running in an operating system kernel 410 on routing engine 102(1). By binding to tunnel driver 114 in this way, application 406 may create and/or establish a socket that facilitates communication between application 406 and another application (not illustrated in FIG. 4) that is running in user space on network device 202(2).

As further illustrated in FIG. 4, network device 202(1) may include an interface 404 on packet forwarding engine 104(1). In one example, the socket created and/or established by application 406 may direct outgoing traffic to interface 404 in FIG. 4. Accordingly, all traffic transmitted via the socket may be initially bound to interface 404.

In one example, application 406 may generate a packet that is destined for the other application running in user space on network device 202(2). The packet may include a first header that identifies network device 202(2) as the destination. In this example, socket-intercept layer 112 running in operating system kernel 410 may hijack and/or intercept the packet on its way to packet forwarding engine 104(1). Upon hijacking and/or intercepting the packet, socket-intercept layer 112 may identify the egress interface index that specifies interface 404 (whether by locating the egress interface index in the packet's control message or "CMSG" header or by querying routing daemon 108). Socket-intercept layer 112 may then pass the packet down the network stack of communications protocols in kernel space on routing engine 102(1).

As the packet traverses the network stack, a transport-layer or L4 hook may intercept the packet and then copy the egress interface index identifying interface 404 from the control message or "CMSG" header to the "skbuff" or mark field of the packet. Upon completion of the copying, the transport-layer or L4 hook may pass the packet further down the network stack.

As the packet continues traversing down the network stack, network-layer filter 114 may intercept the packet and then apply and/or enforce a corresponding firewall rule on the packet. In one example, the identified firewall rule may permit the packet to egress from network device 202(1) via the same egress interface specified by the egress interface index. In another example, the identified firewall rule may cause and/or direct network-layer filter 114 to drop the packet altogether. In a further example, the identified firewall rule may cause and/or direct network-layer filter 114 to redirect the packet through a different egress interface.

Figure 5:
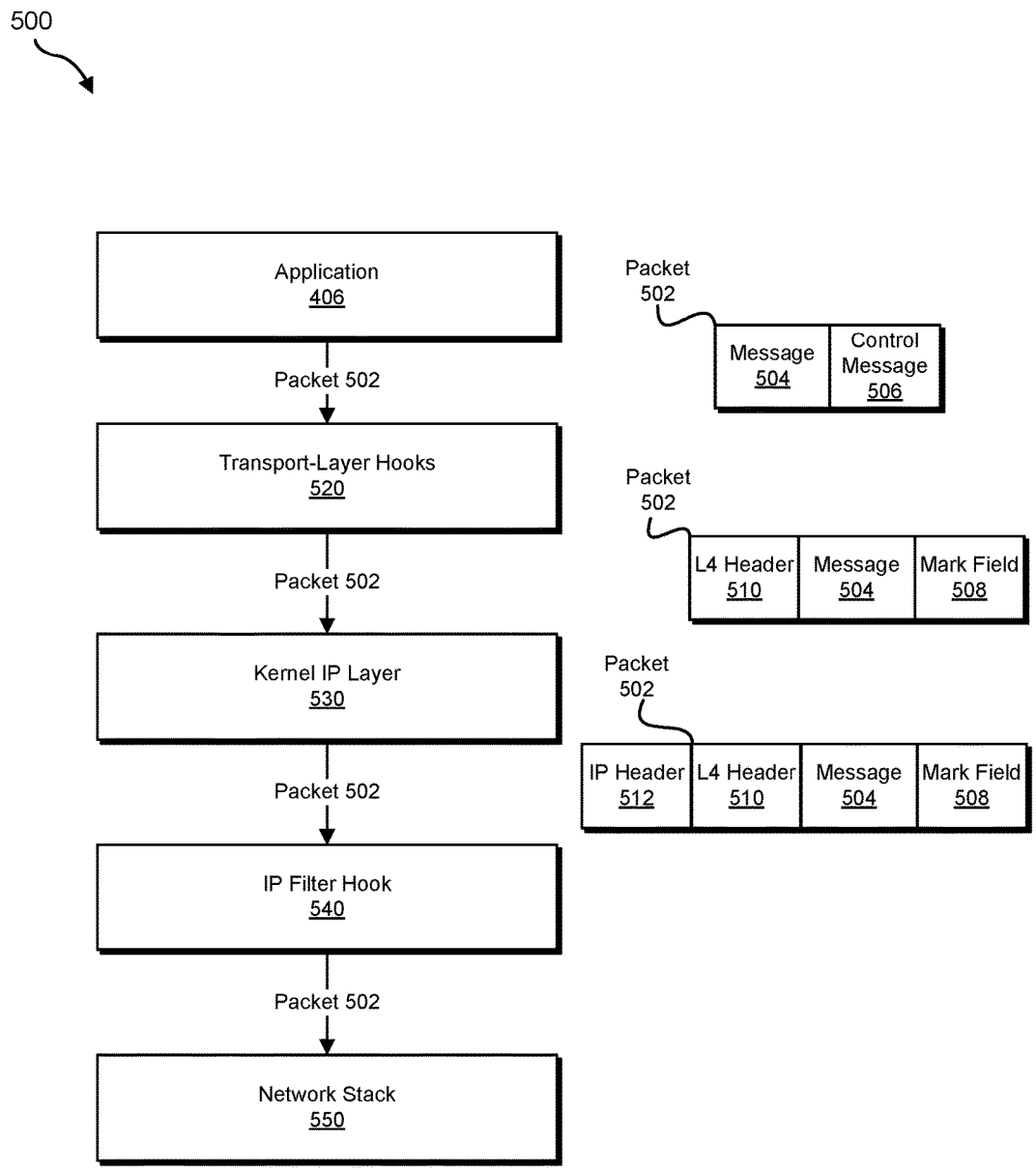
FIG. 5 is an illustration of an exemplary journey of a packet egressing from a network device.

FIG. 5 illustrates an exemplary journey 500 of a packet egressing out of network device 202(1). In this example, application 406 may generate a packet 502 in user space on routing engine 102(1) of network device 202(1). As illustrated in FIG. 5, packet 502 may include a message 504 and a control message 506 when generated by application 406 in user space. Control message 506 may include the egress interface index that identifies the egress interface to which packet 502 is bound. Application 406 may then push, pass, and/or forward packet 502 to kernel space on routing engine 102(1) of network device 202(1). In kernel space, packet 502 may arrive at transport-layer hooks 520 that add an L4 header to packet 502 and copy the egress interface index to a mark filed 508 of packet 502.

From transport-layer hooks 520, packet 502 may traverse to a kernel IP layer 530 that adds an IP header 512 to packet 502. Packet 502 may then traverse to an IP filter hook 540 that searches for a firewall rule whose conditions match the attributes of packet 502. Upon identifying a matching firewall rule, IP filter hook 540 may apply and/or enforce the matching firewall rule on packet 502. After IP filter hook 540 has applied and/or enforced the matching firewall rule, packet 502 may continue traversing down a network stack 550 of communications protocols.

Figure 6:
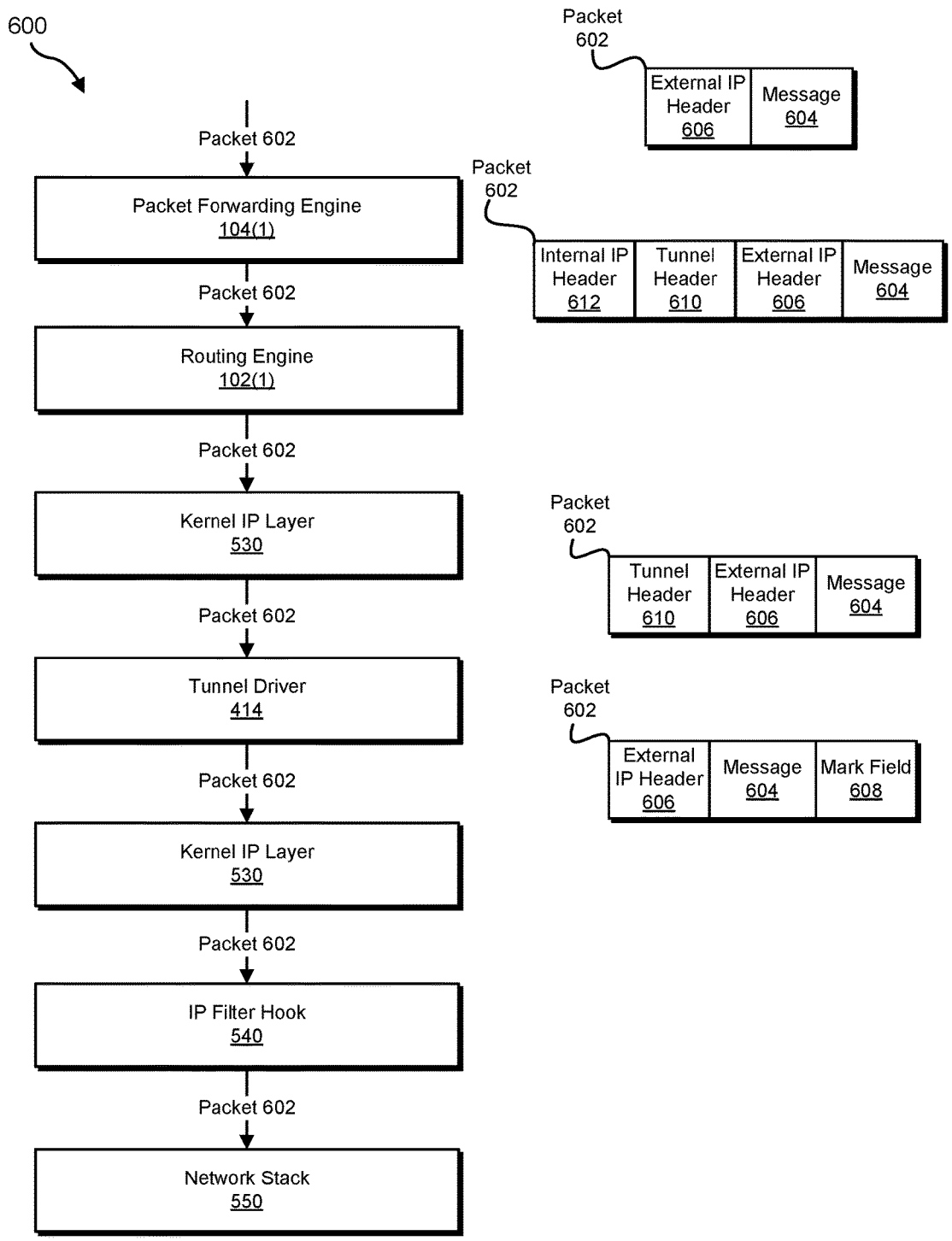
FIG. 6 is an illustration of an exemplary journey of a packet ingressing into a network device.

FIG. 6 illustrates an exemplary journey 600 of a packet ingressing into network device 202(1). In this example, a packet 602 may arrive at packet forwarding engine 104(1). As illustrated in FIG. 6, packet 602 may include a message 604 and an external IP header 606 upon arrival. Packet forwarding engine 104(1) may add an internal IP header 612 and/or a tunnel header 610 to packet 602. In this example, internal IP header 612 may direct the packet toward routing engine 102(1), and tunnel header 610 may include an ingress interface index that identifies the ingress interface on which the packet arrived. Packet forwarding engine 104(1) may then push, pass, and/or forward packet 602 to kernel space on routing engine 102(1) of network device 202(1). In kernel space, packet 602 may arrive at kernel IP layer 530, which pops internal IP header 612 from packet 602.

At kernel IP layer 530, tunnel driver 414 may intercept packet 602 and copy the egress interface index from tunnel header 610 to a mark field 608 of packet 602. Tunnel driver 414 may also remove tunnel header 610 from packet 602. Packet 602 may then traverse to kernel IP layer 530 and IP filter hook 540, which searches for a firewall rule whose conditions match the attributes of packet 502. Upon identifying a matching firewall rule, IP filter hook 540 may apply and/or enforce the matching firewall rule on packet 502. After IP filter hook 540 has applied and/or enforced the matching firewall rule, packet 502 may continue traversing up network stack 550 of communications protocols (unless the matching firewall rule calls for the packet to be dropped).

Figure 8:
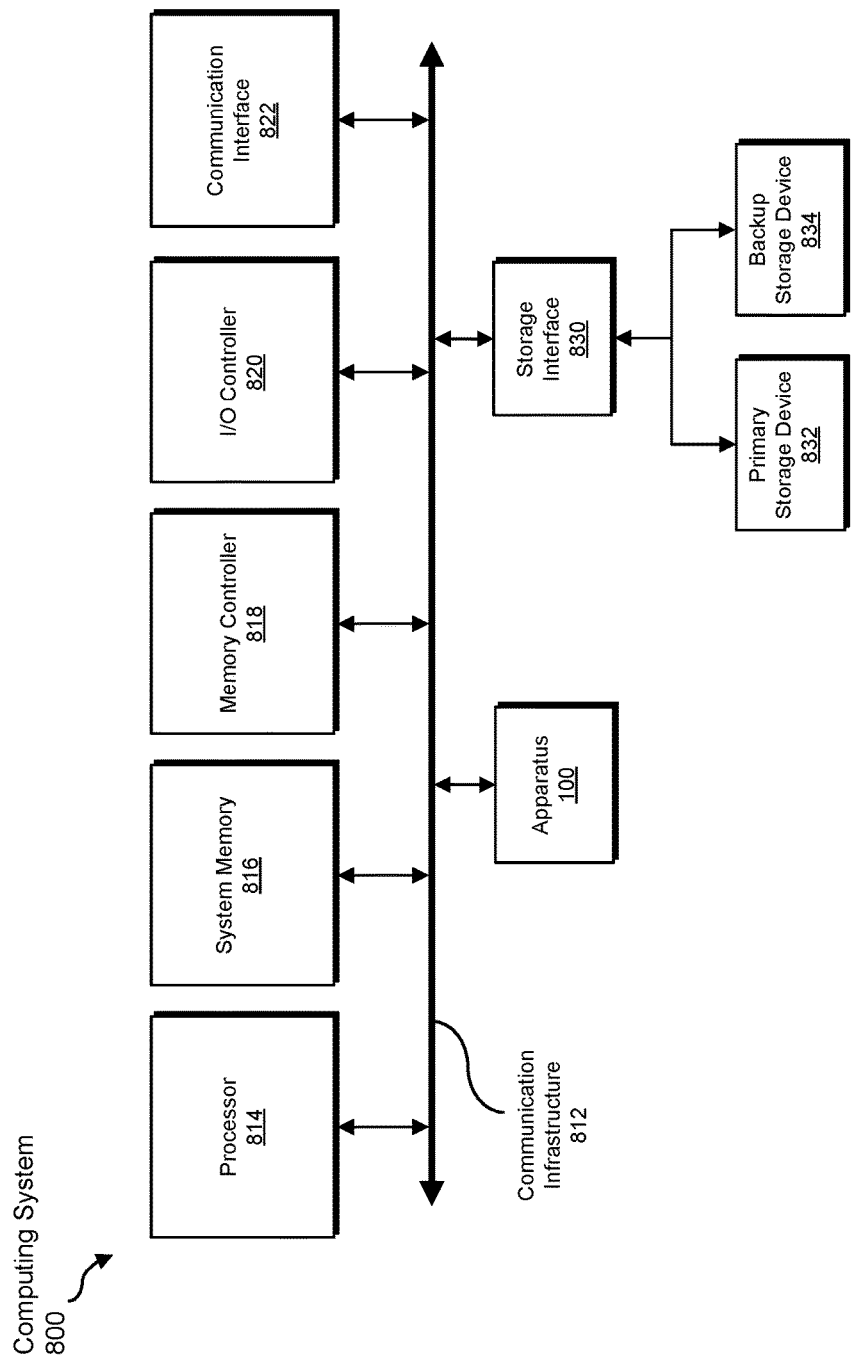
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein. In one example, computing system 800 may include apparatus 100 from FIG. 1.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O)

controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    intercepting, via a socket-intercept layer in kernel space on a routing device of a network device, a packet that is destined for a remote device;
    in response to intercepting the packet in kernel space on the routing device:
        identifying an egress interface index that specifies an egress interface that:
            is external to kernel space; and
            is capable of forwarding the packet from the network device to the remote device;
        recording, by the socket-intercept layer, the egress interface index as metadata of the packet by inserting the egress interface index into a control message header of the packet;
        intercepting the packet via at least one transport-layer hook as the packet traverses a network stack of communications protocols in kernel space on the routing device;
        copying, via the transport-layer hook, the egress interface index from the control message header to a mark field of the packet;
        passing the packet down the network stack of communications protocols in kernel space on the routing device; and
        applying, on the packet in kernel space, at least one firewall rule based at least in part on the egress interface index before the packet egresses from the routing device.

2. The method of claim 1, wherein identifying the egress interface index comprises querying, by the socket-intercept layer, a routing daemon in user space on the routing device for the egress interface index.

3. The method of claim 1, wherein identifying the egress interface index comprises identifying the egress interface index within metadata of the packet.

4. The method of claim 1, wherein the packet originated from an application in user space on the network device; and
    further comprising binding the application to a tunnel driver in kernel space on the routing device to create a socket that facilitates communication between the application and another application on the remote device.

5. The method of claim 1, further comprising intercepting the packet via at least one network-layer filter as the packet continues traversing the network stack of communications protocols; and
    wherein applying the firewall rule on the packet comprises enforcing, by the network-layer filter, the firewall rule on the packet.

6. The method of claim 5, wherein enforcing the firewall rule on the packet comprises preventing the packet from egressing from the network device via the egress interface specified by the egress interface index copied to the mark field of the packet.

7. The method of claim 5, wherein enforcing the firewall rule on the packet comprises dropping the packet in kernel space due at least in part to the firewall rule.

8. The method of claim 1, wherein applying the firewall rule on the packet comprises:
    identifying one or more attributes of the packet;
    identifying one or more firewall rules whose conditions match the attributes of the packet; and
    selecting the firewall rules whose conditions match the attributes of the packet for enforcement on the packet.

9. The method of claim 1, further comprising, upon applying the firewall rule on the packet, pushing the packet to a packet forwarding device on the network device such that the packet forwarding device is able to forward the packet from the network device to the remote device.

10. The method of claim 1, further comprising:
    receiving, via a packet forwarding device of the network device, an additional packet that is destined for an application running in user space on the routing device;
    in response to receiving the additional packet via the packet forwarding device:
        identifying an ingress interface through which the additional packet arrived at the packet forwarding device;
        storing an ingress interface index that specifies the ingress interface as metadata of the additional packet; and
        pushing the additional packet from the packet forwarding device to kernel space on the routing device; and
    applying, on the packet in kernel space on the routing device at least one firewall rule based at least in part on the ingress interface index before the packet reaches user space on the routing device.

11. The method of claim 10, wherein applying the firewall rule on the packet in kernel space on the routing device comprises at least one of:

dropping the packet in kernel space due at least in part to the firewall rule; and preventing the packet from reaching user space on the routing device due at least in part to the firewall rule.

12. A system comprising:
a network device;
a socket-intercept layer, stored in kernel space on a physical routing device of the network device, that:
  intercepts a packet that is destined for a remote device; and
  identifies, in response to intercepting the packet, an egress interface index that specifies an egress interface that:
    is external to kernel space; and
    is capable of forwarding the packet from the network device to the remote device;
  records, by the socket-intercept layer, the egress interface index as metadata of the packet by inserting the egress interface index into a control message header of the packet;
at least one transport-layer hook, stored in kernel space on the physical routing device, that:
  intercepts the packet via at least one transport-layer hook as the packet traverses a network stack of communications protocols in kernel space on the physical routing device;
  copies, via the transport-layer hook, the egress interface index from the control message header to a mark field of the packet; and
  passes the packet down the network stack of communications protocols in kernel space on the physical routing device; and
a network-layer filter, stored in kernel space on the physical routing device that applies on the packet at least one firewall rule based at least in part on the egress interface index before the packet egresses from the physical routing device.

13. The system of claim 12, wherein the socket-intercept layer identifies the egress interface index by querying a routing daemon in user space on the physical routing device for the egress interface index.

14. The system of claim 12, wherein the socket-intercept layer identifies the egress interface index within metadata of the packet.

15. The system of claim 12, wherein the packet originated from an application in user space on the network device; and
wherein the application binds to a tunnel driver in kernel space on the physical routing device to create a socket that facilitates communication between the application and another application on the remote device.

16. A network device comprising:
a physical routing device that comprises:
  a socket-intercept layer, stored in kernel space, that:
    intercepts a packet that is destined for a remote device; and
    identifies, in response to intercepting the packet, an egress interface index that specifies an egress interface that:
      is external to kernel space; and
      is capable of forwarding the packet from the network device to the remote device;
    records, by the socket-intercept layer, the egress interface index as metadata of the packet by inserting the egress interface index into a control message header of the packet;
    intercepts the packet via at least one transport-layer hook as the packet traverses a network stack of communications protocols in kernel space on the physical routing device;
    copies, via the transport-layer hook, the egress interface index from the control message header to a mark field of the packet;
    passes the packet down the network stack of communications protocols in kernel space on the physical routing device;
  a network-layer filter, stored in kernel space, that applies on the packet at least one firewall rule based at least in part on the egress interface index before the packet egresses from the physical routing device; and
a physical packet forwarding device that forwards the packet to the remote device based at least in part on the egress interface index after the packet has egressed from the physical routing device.

* * * * *